United States Patent [19]

Elam, Sr.

[11] 3,747,508

[45] July 24, 1973

[54] APPARATUS FOR COOKING HOLLOW DOUGH PRODUCT
[75] Inventor: Thomas E. Elam, Sr., Clarksville, Tenn.
[73] Assignee: Merrill Lynn Elam, Atlanta, Ga.
[22] Filed: Dec. 21, 1971
[21] Appl. No.: 210,347

[52] U.S. Cl............... 99/354, 99/382, 99/442, 99/443 C, 99/450.6
[51] Int. Cl. A21c 11/00, A21c 15/00, A21d 13/08, A23p 1/00
[58] Field of Search............... 99/442, 353, 354, 99/373, 382, 383, 419, 428, 443 C, 450.6, 355

[56] References Cited
UNITED STATES PATENTS
1,507,883   9/1924   Campbell................ 99/373
1,974,204   9/1934   Cooter.................. 99/383 X
1,984,027   12/1934  Lyons................... 99/353 UX
2,059,133   10/1936  Merritt................. 99/383 UX
2,252,990   8/1941   Smith................... 99/428 UX Primary Examiner—Wayne A. Morse, Jr.
Assistant Examiner—Arthur O. Henderson
Attorney—Harvey B. Jacobson

[57] ABSTRACT

A cooking apparatus is provided which bakes hollow dough products in a continuous cycle. A dough dispensing mechanism automatically fills conveyor mounted cooking molds prior to entering the oven. A molding rod extends horizontally into the interior of each mold and remains there during the baking process. After the baking is completed, each molding rod is automatically pivoted away from the interior of its mold with the dough product remaining thereon. As the conveyor continues to advance, the dough product is automatically pulled from each molding rod. Each molding rod is returned to its original horizontal position in each mold, and each mold is refilled by the dough dispensing mechanism to repeat the cooking cycle.

16 Claims, 15 Drawing Figures

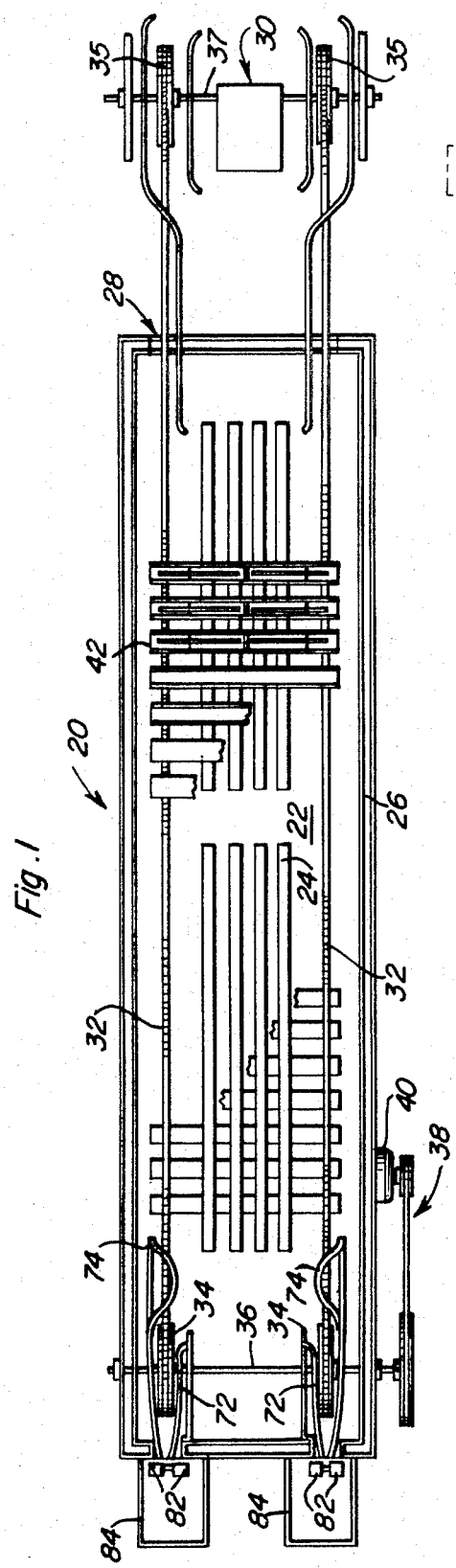
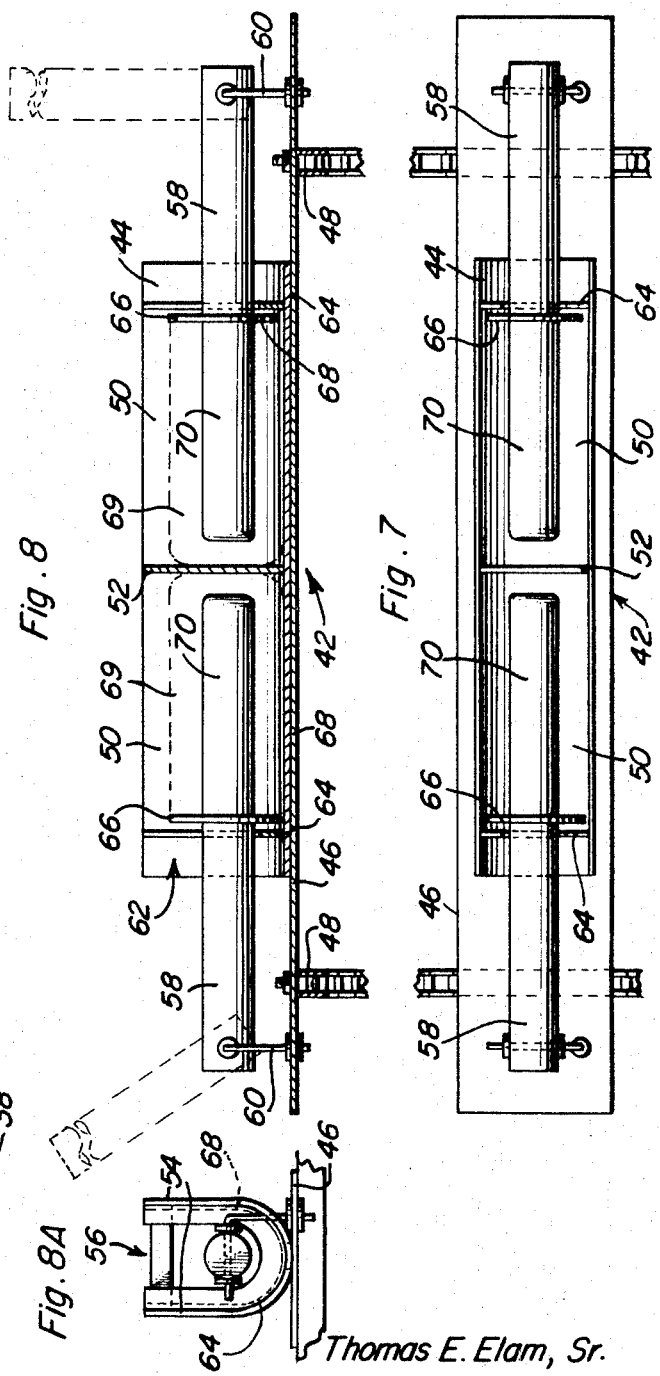

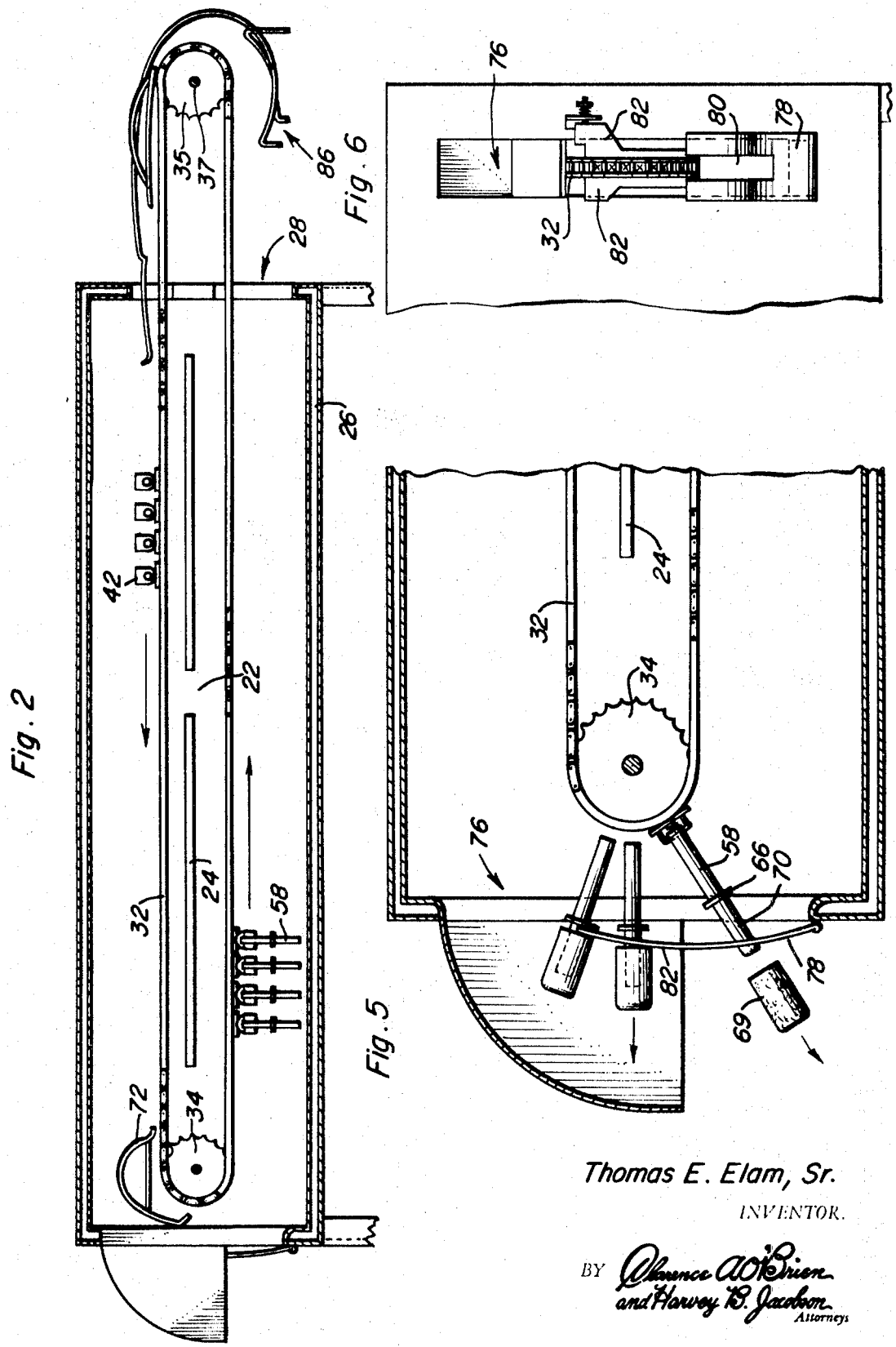

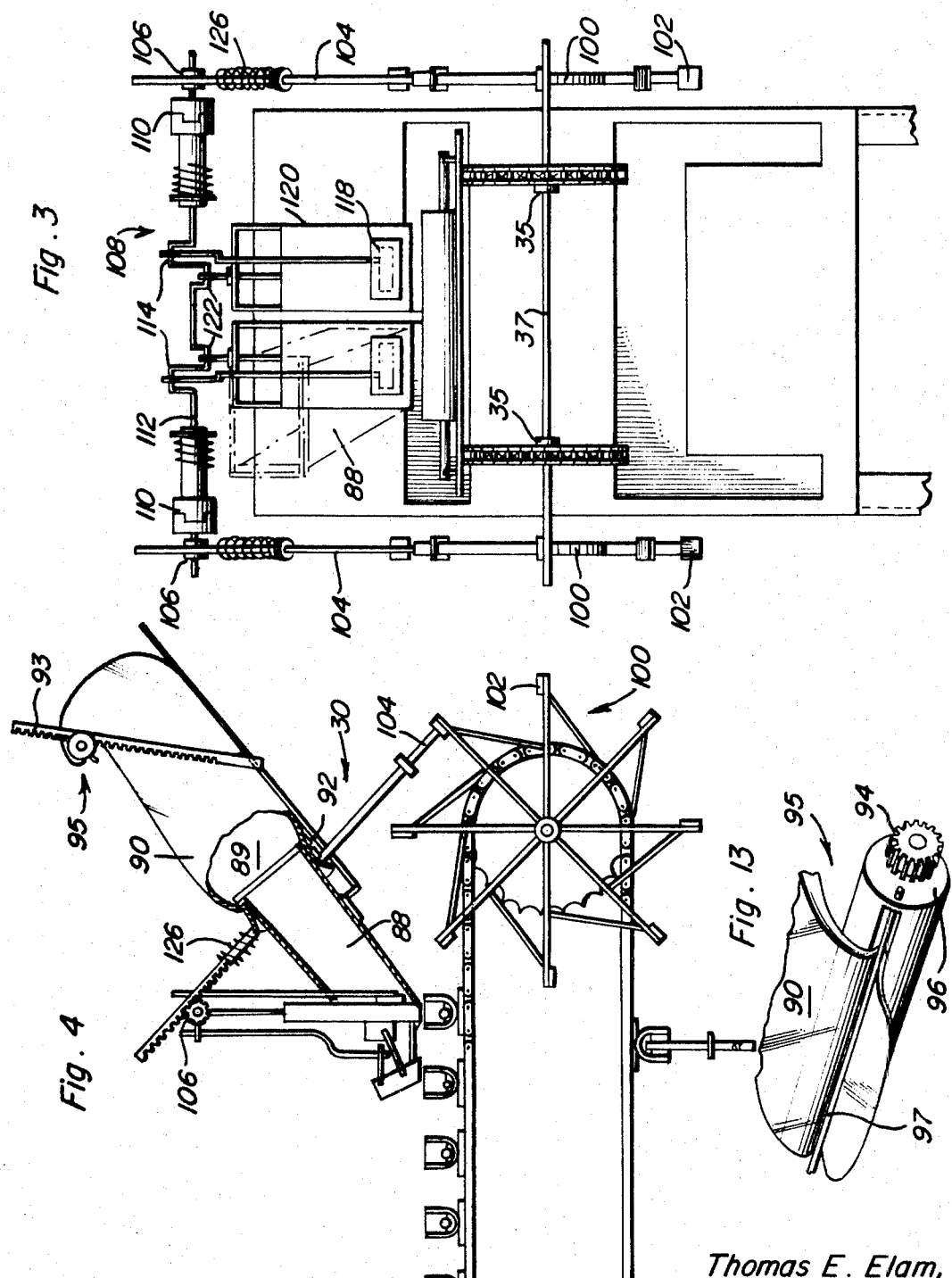

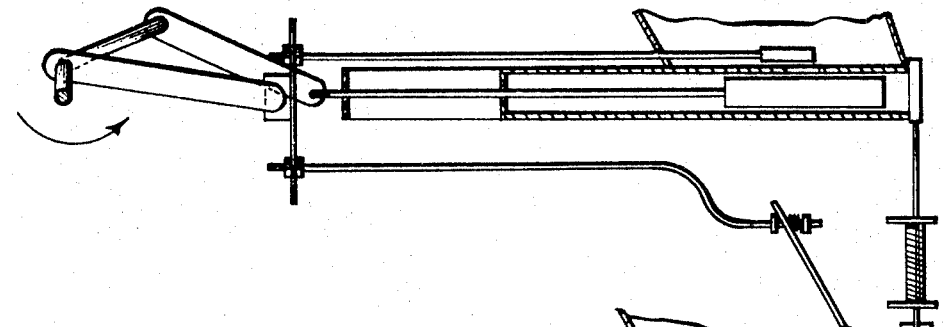
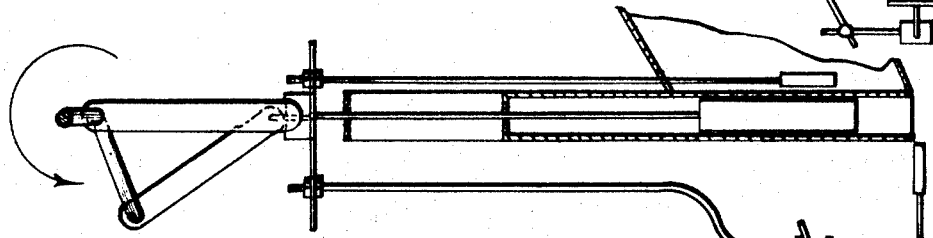
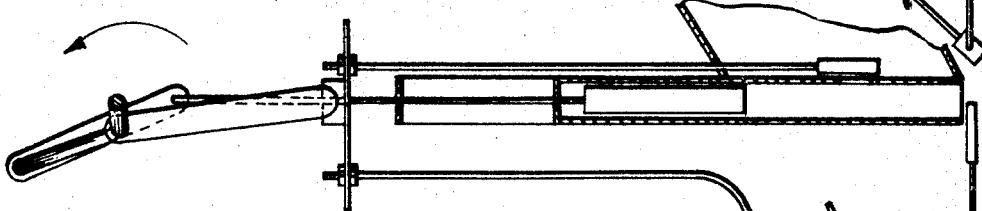
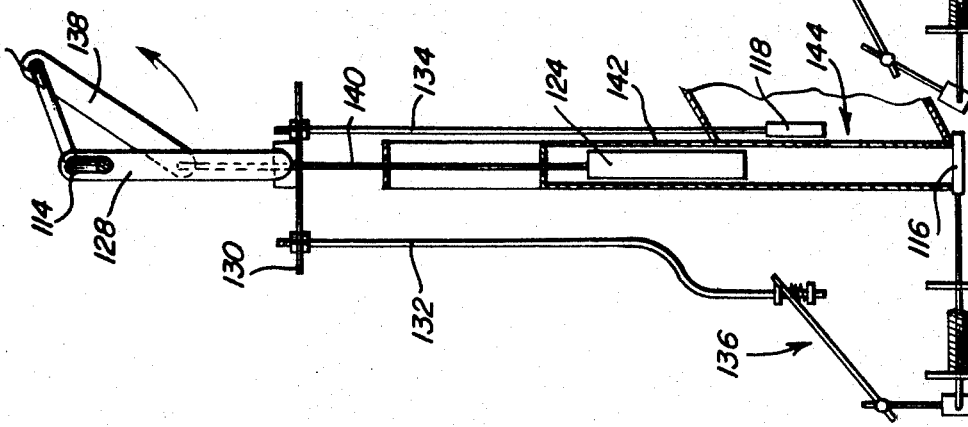
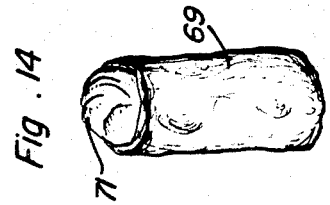
Thomas E. Elam, Sr.
INVENTOR.

APPARATUS FOR COOKING HOLLOW DOUGH PRODUCT

The present invention is related generally to apparatus for cooking molded dough products in a continuous process, and more particularly to the cooking of hollow dough products.

It is an object of the present invention to provide a cooking apparatus which automatically mass produces hollow dough products.

Another object of the present invention is to provide a mold assembly having a mold with a rod extending therein to shape a hollow dough product.

It is still another object of the present invention to provide a cooking apparatus wherein hollow dough products are automatically removed from their molds subsequent to baking.

Another object of the present invention is to provide a dough dispensing assembly which automatically measures and fills each mold prior to entering the cooking oven.

It is a further object of the present invention to provide a cooking apparatus which sequentially removes the molding rods from their molds, removes the dough product from the molding rods, and returns the molding rods to their original position in each mold.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view of the cooking apparatus with oven top and portions removed.

FIG. 2 is a simplified side view with portions broken away of the cooking apparatus shown in FIG. 1.

FIG. 3 is an end view of the cooking apparatus with a phantom view of the dough hopper.

FIG. 4 is a side view of the dough dispensing assembly with portions removed.

FIG. 5 illustrates removal of the dough products as the conveyor advances.

FIG. 6 is a partial end view of the apparatus with the dough product remover mounted at an exit opening.

FIG. 7 is a plan view of a mold assembly with the mold rods in the horizontal position.

FIG. 8 is a side elevational view of the mold assembly shown in FIG. 7 with phantom views of the mold rods in nonhorizontal positions.

FIG. 8A is an end view of the mold assembly shown in FIG. 8.

FIG. 9 is a sectional view of the dough dispensing assembly with the dough receiving door opened.

FIG. 10 is a sectional view of the dough dispensing assembly shown in FIG. 9 with the crankshaft assembly advanced ¼ turn.

FIG. 11 is a sectional view of the dough dispensing assembly shown in FIG. 9 with the crankshaft assembly advanced ½ turn.

FIG. 12 is a sectional view of the dough dispensing assembly shown in FIG. 9 with the crankshaft assembly advanced ¾ turn.

FIG. 13 is a perspective view of the dough bag compressor mounted to the end of a dough bag.

FIG. 14 is a perspective view of a cooked dough product with a filling in the hollow thereof.

Referring specifically to FIG. 1, the cooking apparatus is generally indicated by the numeral 20. It includes an oven 22 which contains a plurality of heating units 24 surrounded by an oven enclosure 26 with an entrance opening 28 at one end thereof. A dough dispensing assembly 30 is located adjacent to oven opening 28. A pair of parallel conveyor chains 32 extend through the oven opening 28 into the interior of oven 22. The chains are driven by a pair of drive sprockets 34 which are coupled to a main drive shaft 36 connected to a power transmission assembly such as the belt and pulley drive 38 shown in FIG. 1. Motor means 40, such as an electric motor, is coupled with belt and pulley drive 38 for advancing the conveyor chain 32 through the oven 22. Chains 32 extend the length of the oven through opening 28 to driven sprockets 35 fixedly attached to rotatable driven shaft 37.

Attached to conveyor chains 32 are a plurality of mold assemblies 42, each of which extends transversely between the parallel conveyor chains 32. The details of each mold assembly 42 are shown in FIGS. 7 and 8. Each assembly includes a mold enclosure 44 which is attached to a mold carrier plate 46 having a pair of carrier tabs 48 extending in the downward direction to engage conveyor chains 32. In the preferred embodiment, each mold enclosure 44 includes a pair of mold compartments 50 separated from each other by a vertical wall 52. The bottom portion of each mold compartment 50 is substantially semi-cylindrical in shape with a pair of side walls 54 extending upwardly in the vertical direction to define an opening 56 through which the dough is placed into each mold compartment 50. A pair of mold rods 58 are each pivotally supported on a support arm 60 fastened to carrier plate 46 and extend through a side opening 62 defined by a U-shaped flange member 64 extending around the interior end portion of each mold compartment. Each mold rod 58 includes an annular mold flange 66 extending outwardly around its center portion having a peripheral edge 68 which corresponds in shape to the interior surface of mold compartment 50 to provide an adequate seal therewith. There is adequate clearance between flanges 64 and mold flanges 66 to permit each mold rod 58 to be pivoted about support arm 60 from a horizontal position to a vertical position as shown in FIG. 8.

At the beginning of the cooking process, mold rods 58 are in the horizontal position. Raw dough or batter 69 is dispensed into each mold compartment to completely surround mold rod ends 70. Each mold compartment 50 is filled to a level wherein the dough or batter reaches the top edge of mold flanges 66, as shown in FIG. 8. Mold flanges 66, corresponding in shape to the inner surface of the mold compartments form a substantial seal which prevents the batter or dough from oozing out of the mold compartment past flange 64. Thus, it can be seen that mold rod ends 70 form a hollow extending into the dough 69 dispensed in each mold compartment. After the dough has been cooked in the oven, each mold rod 58 is pivoted to the vertical position and dough product 69 is removed from mold rod ends 70 as hereinafter explained.

FIG. 2 shows a plurality of mold assemblies 42 which move through oven 22 from the right to the left. The speed of conveyor chain 32 is set such that when a mold assembly 42 reaches the left end of the oven 22 the dough product has been properly cooked and is ready for removal from the oven. At the extreme left of oven 22 a pair of vertical tilt rails 72 each engages the lower surface of a mold rod 58 to tilt it to the vertical position. A pair of vertical guides 74, shown in FIG. 1, in conjunction with tilt guide rails 72 provide a channel which holds each mold rod 58 in the vertical position as chain conveyor 32 advances. As conveyor chains 32 ride around drive sprockets 34, the end portions 70 of each mold rod 58 extend through oven exit opening 76. As shown in FIGS. 5 and 6, a dough product remover 78 is mounted adjacent each exit opening 76 and has a vertical slot 80 therein which is in alignment with the chain and sprocket 32 and 34. A pair of removing fingers 82 curve upward in a manner shown in FIG. 5, such that the curve of fingers 82 is nonconcentric with drive sprocket 34. As conveyor chain 32 advances, the tops of each finger engage dough product 69 adjacent to mold flange 66. The slot 80 of each remover 78 is of a width which is just slightly greater than the diameter of mold rods 58 such that fingers 82 firmly engage dough product 69, and as conveyor chain 32 continues to advance, dough product 69 is pulled off of each mold rod 58 and falls into a collecting bin 84, shown in FIG. 1. As conveyor chains 32 continue to move, mold assemblies 42 are returned to the right end of oven 22 with mold rods 58 still in the inverted vertical position, as shown in FIG. 1.

After each mold assembly 42 leaves oven 22 through opening 28, mold rods 58 engage a pair of horizontal tilt rails 86 at the right end of the cooking apparatus which returns the rods to their original horizontal position, just prior to arriving under dough dispenser assembly 30.

Dough dispensing assembly 30 includes a pair of hoppers 88 into which dough 89 is fed from bags 90 which are suitably fastened to each hopper mouth 92. Each bag 90 is preferably made of a strong, flexible material, such as polyurethane, to withstand squeezing without bursting. The dough is forced into hopper 88 by compressing bag 90 through a mechanism such as a rack and pinion assembly 95 shown in FIGS. 4 and 13. A rigidly mounted rack 93 is engaged with a pinion 94 that is attached to a gravity operated relatively heavy roller 96 which causes bag 90 to be wrapped around roller 96 due to the rod 97 which anchors the bag 90 to the roller 96 thereby squeezing the dough 89 from bag 90 into hopper 88.

The dough dispensing assembly is connected with the conveyor assembly by way of a pair of actuating wheels 100 each fastened to driven shaft 37 for rotation therewith. Each actuating wheel 100 includes a plurality of actuating feet 102 which sequentially engage an actuation rack member 104 for longitudinal movement thereof to rotate pinions 106 which are coupled to crankshaft assembly 108. The crankshaft assembly 108 includes a pair of clutches 110 which are effective to engage and disengage the crankshaft assembly with pinions 106. Crankshaft 112 is rotated through clutches 110 and includes a first pair of offset sections 114 which function to open and close the dough dispensing and dough receiving doors 116 and 118 of dough feeders 120, as hereinafter explained. A second pair of offset portions 122 of crankshaft 112 operate a feeder plunger 124 contained in each feeder 120. Thus, it can be seen that as actuating wheels advance in the counter-clockwise direction, shown in FIG. 4, one of the actuating feet on each wheel will advance actuation racks 104 to rotate crankshaft assembly 108. Each actuation rack 104 is biased in downward direction by a compression spring 126 such that as actuation rack 104 slips off each of the rotating actuation feet 102, it is rapidly returned to its original position to engage the next actuation foot 102. During the rapid return of racks 104 clutches 110 are disengaged inasmuch as they are conventional one-way clutches or they may be disengaged by a mechanism, such as an electromagnetic relay, such that the return movement of rack 104 is not transferred to crankshaft assembly 108. Also, the clutches 110 may be manually disengaged when desired.

The operation of crankshaft assembly 108 is shown in detail by FIGS. 9 through 12. A door arm 128 is pivotally connected to crankshaft portion 114 and to plate 130 at opposite ends thereof, with dispensing door rod 132 and receiving door 134 both connected to plate 130. Dough receiving door 118 is directly connected to rod 134, and dough dispensing door 116 is connected with rod 132 by way of a door closing device 136. A plunger arm 138 is pivotally connected to crankshaft portion 122 and to plunger rod 140 at the opposite ends thereof with plunger rod 140 extending into feeder housing 142 where it is fastened to plunger 124.

At the beginning of a rotation cycle of crank assembly 108, feeder 120 is filled with dough which has been forced in through receiving opening 144 with door 118 in the open position. During this time, dough dispensing door 116 is in the closed position. As crankshaft assembly 108 advances one-quarter of a turn, the components assume the position shown in FIG. 10, wherein door 118 is closed, plunger 124 is in the uppermost position, and dough dispensing door 116 is partially opened. As rotation continues, plunger 124 begins in the downward direction with dough dispensing door 116 in the fully opened position to arrive at the one-half rotation position as shown by FIG. 11. At this position, the desired amount of dough has been dispensed into a mold assembly 42 and dough dispensing door 116 begins to close. FIG. 12 shows the position of the components at three-quarters of a rotation in the cycle, with both doors fully closed and with the plunger 124 starting to move in the upward direction. As the cycle advances to a full rotation, the components will assume the position as shown in FIG. 9. Thus, it can be seen that the dough dispensing assembly 30 provides a means of dispensing the proper amount of dough into each mold assembly 42 at the proper times in the cycle.

It will be appreciated that the present invention provides a cooking apparatus for mass producing a hollow dough product, wherein the dispensing of the dough, the cooking in the oven, and the removal of the dough product is automatically handled in a continuous process. In the preferred embodiment the cooked hollow dough product is cylindrical in shape, the hollow being filled with a tasty filling 71 as shown in FIG. 14. It will be appreciated, that it is within the scope of the present invention to alter the shape of the molds and mold rods to provide a variety of different shaped dough products. For example, the dough products might be molded conical in shape or with ripples on the sides. An unlimited number of shapes can be arrived at so long as the mold rods are shaped to permit pulling of the cooked dough product from their ends without damage to the product.

The foregoing is considered as illustrative only of the principles of the invention. Further, since numerous

What is claimed as new is as follows:

1. A cooking mold assembly for molding a hollow dough product, said mold assembly comprising a mold enclosure, a first opening at one end of said mold enclosure, and first mold rod means extending horizontally through said first opening and into said mold enclosure for forming a hollow in the dough product, said first mold rod means being pivotally mounted at a point outside said mold enclosure for rotation between said horizontal position and a vertical position wherein said first mold rod means lies outside of said mold enclosure when in the vertical position, said first opening being defined by a U-shaped flange extending around the interior of said mold enclosure with said first mold rod means extending through said first opening when in the horizontal position, said first mold rod means including a rod with a molding flange extending outwardly therefrom with an outer edge substantially the same shape as the interior surface of said mold enclosure to form a seal therewith, said molding flange being interior of said U-shaped flange when said rod is in the horizontal position.

2. The combination set forth in claim 1 together with a second opening at the other end of said mold enclosure, and a vertical partition in the center of said mold enclosure dividing the interior thereof into first and second mold compartments, said first mold rod means extending into said first mold compartment.

3. The combination set forth in claim 2 together with second mold rod means extending horizontally through said second opening into said second mold compartment and being pivotally mounted for rotation between a horizontal position and a vertical position wherein the entire of said second mold rod means lies outside of said second mold compartment when in the vertical position.

4. An apparatus for cooking hollow dough products said apparatus comprising a plurality of mold assemblies, conveyor means for moving said mold assemblies, each of said mold assemblies including a mold enclosure and a pivotally mounted mold rod extending into said mold enclosure when in a first position, and first tilt means mounted adjacent said conveyor means for pivoting said mold rods from said first position to a second position as said conveyor means advances said mold assemblies past a certain point, said mold rods lying outside of said enclosures when in said second position, and dough product removing means for removing the cooked dough product from said mold rods after said mold rods have been pivoted to said second position by said first tilt means, said dough product removing means including a pair of elongated fingers which engage the dough product as each of said mold rods is moved in a curved path by said conveyor means.

5. The combination set forth in claim 4 together with second tilt means for pivoting said mold rods back to said first position after said dough product removing means has removed the cooked dough product from said mold rods.

6. The apparatus set forth in claim 5 wherein said first tilt means and said second tilt means include first and second pairs of rails respectively, said first and second pairs of rails being mounted in the path of travel of said mold assemblies to engage said mold rods as they are advanced by said conveyor means.

7. An apparatus for cooking dough products, said apparatus comprising a plurality of mold assemblies, conveyor means for moving said mold assemblies, dough dispensing means adjacent said conveyor means for sequentially dispensing a predetermined amount of dough into each of said mold assemblies as they are advanced by said conveyor means, said dough dispensing means including dough feeder means having a feeder housing, a reciprocating plunger in said feeder housing, a dough receiving door, and a dough dispensing door, and sequential actuating means connected with said conveyor means for sequentially actuating said plunger, said dough receiving door and dough dispensing door to sequentially dispense a predetermined amount of dough into each of said mold assemblies as they are advanced by said conveyor means.

8. The apparatus set forth in claim 7 wherein said dough dispensing means includes compression means for forcing dough into said feeder housing when said dough receiving door is opened by said sequential actuating means.

9. The apparatus set forth in claim 8 wherein said sequential actuating means closes said dough receiving door before opening said dough dispensing door, and wherein said sequential actuating means pushes said plunger within said feeder housing after said dough dispensing door has been opened to dispense a predetermined amount of dough through said dough dispensing door.

10. The apparatus as defined in claim 7 together with cooking means associated with said conveyor means for receiving the mold assemblies after dough is dispensed therein for cooking the dough, and means removing the cooked dough from the mold assemblies after being cooked by the cooking means.

11. The apparatus as defined in claim 10 wherein each mold assembly includes a mold enclosure, a movably mounted mold rod disposed in said enclosure when in a first position to form a hollow dough product, said means for removing the cooked dough including means moving the mold rod to a second position outside of the mold enclosure, and means stripping the cooked dough product from the mold rod while in its second position.

12. The apparatus as defined in claim 1 together with cooking means receiving said mold assemblies for cooking the dough therein as the conveyor means conveys the mold assemblies therethrough, and means removing the cooked dough product from the mold rod when in its second position.

13. An apparatus for cooking dough products comprising a conveyor means, a plurality of mold enclosures carried by said conveyor means for movement in an endless path, cooking means for cooking dough in the enclosures during movement along at least a portion of their path, means lifting the cooked dough product out of the enclosure, and means removing the cooked dough product from the lifting means in response to movement of the enclosures in their path of movement after the lifting means has elevated the cooked dough product from the enclosure.

14. The combination of claim 13 wherein said lifting means is in the form of a mold rod extending into each enclosure to form hollow dough products, each of said mold rods being pivotally supported from the conveyor means externally of said enclosure, said mold rod being pivoted outwardly of the enclosure in response to movement of the enclosures in their path of movement.

15. The combination of claim 14 wherein said lifting means includes rail guide means mounted adjacent said conveyor means to engage said mold rods to lift them out of said enclosures, said means removing the cooked dough product from the lifting means includes finger members mounted adjacent the conveyor means for engaging the end of the cooked dough product adjacent the pivotal end thereof and moving the dough product off the other end of the rod.

16. The combination of claim 15 together with dough dispensing means disposed above the path of movement of the enclosures, each of the enclosures being open-topped to enable uncooked dough to be deposited into each of the enclosures.

* * * * *